United States Patent
Kayama

(10) Patent No.: US 8,749,817 B2
(45) Date of Patent: Jun. 10, 2014

(54) INFORMATION PROCESSING APPARATUS, METHOD, MEDIUM, AND SYSTEM FOR PRINT JOB TRANSMISSION

(75) Inventor: Hiroyuki Kayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 795 days.

(21) Appl. No.: 12/615,273

(22) Filed: Nov. 10, 2009

(65) Prior Publication Data

US 2010/0134829 A1    Jun. 3, 2010

(30) Foreign Application Priority Data

Nov. 28, 2008    (JP) ................................ 2008-305628

(51) Int. Cl.
*G06F 3/12*    (2006.01)

(52) U.S. Cl.
USPC ......... 358/1.15; 358/1.16; 370/231; 709/224; 709/235

(58) Field of Classification Search
USPC .............. 270/58.18; 271/290; 358/1.14, 1.15, 358/1.16; 370/235, 537, 231; 399/23, 24, 399/82; 400/76; 700/214; 709/203, 224, 709/235; 710/263; 726/4
See application file for complete search history.

(56) References Cited

U.S. PATENT DOCUMENTS

| | | | | |
|---|---|---|---|---|
| 5,898,592 | A * | 4/1999 | Salgado et al. ................ | 700/214 |
| 6,023,560 | A * | 2/2000 | Yoshida et al. ............... | 358/1.16 |
| 6,366,744 | B1 * | 4/2002 | Phillips et al. ................. | 399/24 |
| 7,738,379 | B1 * | 6/2010 | Bakshi .......................... | 370/235 |
| 2002/0048036 | A1 * | 4/2002 | Nakagawa et al. .......... | 358/1.14 |
| 2002/0138612 | A1 * | 9/2002 | Sekizawa ...................... | 709/224 |
| 2003/0102619 | A1 * | 6/2003 | Tamai et al. ................ | 270/58.18 |
| 2004/0145772 | A1 * | 7/2004 | Stringham ................... | 358/1.15 |
| 2004/0170460 | A1 * | 9/2004 | Mokuya et al. ................ | 400/76 |
| 2006/0268337 | A1 * | 11/2006 | Leiman et al. ............... | 358/1.15 |
| 2009/0328159 | A1 * | 12/2009 | Luo ................................. | 726/4 |

FOREIGN PATENT DOCUMENTS

| | | |
|---|---|---|
| EP | 0768266 A1 | 4/1997 |
| EP | 1548569 A2 | 6/2005 |
| JP | 09073374 | 3/1997 |
| JP | 9-274548 A | 10/1997 |
| JP | 09307593 | 11/1997 |

(Continued)

OTHER PUBLICATIONS

European Search Report, dated Oct. 16, 2012 in corresponding European Application No. EP 09177377.0.

(Continued)

*Primary Examiner* — David S Cammack
(74) *Attorney, Agent, or Firm* — Fitzpatrick, Cella, Harper & Scinto

(57) ABSTRACT

The information processing apparatus acquires the status of a print job transmitted to the printing apparatus by the information processing apparatus, and retains the status as a list of the print job and the status; and acquires information regarding a print job retained by the printing apparatus, and retains the information as a list of the print job retained by the printing apparatus and the information. The information processing apparatus refers to the list of the print job and the status and the list of the print job and the information and stops the transmission of a print job if the number of jobs that have already been transmitted to the printing apparatus by the information processing apparatus is equal to or exceeds a predetermined threshold value or if the number of print jobs retained by the printing apparatus is equal to or exceeds a predetermined threshold value.

9 Claims, 10 Drawing Sheets

(56) References Cited

FOREIGN PATENT DOCUMENTS

| JP | 10289075 A | * 10/1998 | ................ G06F 3/12 |
| JP | 2001-75767 A | 3/2001 | |
| JP | 2004-86927 A | 3/2004 | |
| JP | 2004-195845 A | 7/2004 | |
| JP | 2007-213123 A | 8/2007 | |

OTHER PUBLICATIONS

Japanese Office Action dated Jan. 28, 2013, in corresponding Japanese Application No. 2008-305628.

* cited by examiner

- 700
- HEADER INFORMATION — 701
- OUTPUT SETTING INFORMATION — 702
- OUTPUT DATA — 703

| JOB NAME | JOB ID | INTRA-DEVICE JOB ID | PRINTER | STATUS |
|---|---|---|---|---|
| Job1 | 001 | 10020001 | PrinterA | MID-PRINT |
| Job2 | 002 | 10020003 | PrinterA | PRINT WAITING |
| Job3 | 003 | 10020006 | PrinterA | MID-PROCESSING |
| Job4 | 004 | 10020008 | PrinterA | PROCESSING WAITING |
| Job5 | 005 | — | PrinterA | MID-TRANSFER |
| Job6 | 006 | — | PrinterA | TRANSFER WAITING |
| Job7 | 007 | — | PrinterA | TRANSFER WAITING |
| Job8 | 008 | — | PrinterA | TRANSFER WAITING |

| PRINTER | INTRA-DEVICE JOB ID | JOB ID | JOB NAME | USER NAME | PAGE NUMBER | SIZE | PAPER DISCHARGE DESTINATION | ESTIMATED PRINT END TIME | PRIORITY |
|---|---|---|---|---|---|---|---|---|---|
| PrinterA | 10020001 | 001 | Job1 | USER A | 10 | 5MB | TRAY 1 | 9:30 | 10 |
| PrinterA | 10020002 | 101 | JobA | USER B | 20 | 12MB | TRAY 2 | 9:32 | 10 |
| PrinterA | 10020003 | 002 | Job2 | USER A | 10 | 5MB | TRAY 1 | 9:33 | 8 |
| PrinterA | 10020004 | 102 | JobB | USER B | 35 | 20MB | TRAY 2 | 9:40 | 4 |
| PrinterA | 10020005 | 201 | JobC | USER C | 40 | 35MB | TRAY 3 | 9:55 | 2 |
| PrinterA | 10020006 | 003 | Job3 | USER A | 15 | 7MB | TRAY 1 | 10:00 | 6 |
| PrinterA | 10020007 | 301 | JobD | USER D | 20 | 15MB | TRAY 4 | 10:15 | 8 |
| PrinterA | 10020008 | 004 | Job4 | USER A | 25 | 22MB | TRAY 1 | 10:30 | 4 |

INFORMATION PROCESSING APPARATUS, METHOD, MEDIUM, AND SYSTEM FOR PRINT JOB TRANSMISSION

BACKGROUND OF THE INVENTION

1. Field of the Invention

The present invention relates to an information processing apparatus that processes a print job, an information processing method, a medium storing a program thereof, and an information processing system.

2. Description of the Related Art

Conventionally, in a printing system that transfers a large amount of print data to a printing apparatus to print the print data, a technique of alleviating the load on the printing apparatus by adjusting the amount of print data to be transferred, in accordance with restrictions such as the width or the capacity of a data bus or the capacity of a receiving buffer of the printing apparatus, has been realized (Japanese Patent Laid-Open No. 09-073374).

Moreover, a technique of transmitting, from an information processing apparatus, a signal for requesting the transfer of print data or a signal for requesting the stopping of print data transfer depending on the amount of print data accumulated in the information processing apparatus has been realized (Japanese Patent Laid-Open No. 09-307593).

Assuming a configuration in which a single printing apparatus is present for a plurality of printing systems, there is a case where a large amount of print data (also referred to as print jobs) is transferred to the printing apparatus. In such a case, depending on the timing at which the number of print jobs to be transferred is adjusted, there may be a printing system that cannot transfer a print job. As a result, there is a possibility that processing will be performed in an unbalanced manner in favor of a specific printing system.

Moreover, it is also conceivable that there is a case where an information processing apparatus that receives a print job is not adapted to a technique of adjusting the amount of print data to be transferred, by means of a configuration that determines the number of accumulated print jobs and a configuration that transmits signals to request the transfer of a print job and request the stopping of the transfer of a print job. In such a case, a large number of print jobs are transferred from a printing system, and consequently, the load on the information processing apparatus increases.

SUMMARY OF THE INVENTION

An aspect of the present invention is to eliminate the above-mentioned problems with the conventional technology. The present invention provides an information processing apparatus that is capable of realizing print processing of high performance and high reliability when a great number of print jobs are transferred from the information processing apparatus to a printing apparatus, an information processing method, a medium storing a program thereof, and an information processing system.

The present invention in its first aspect provides an information processing apparatus that generates a print job and transmits the print job to a printing apparatus, the information processing apparatus comprising:

a first acquiring unit configured to acquire a status of a print job transmitted to the printing apparatus by the information processing apparatus, by communicating with the printing apparatus, and retains the status as a list of the print job and the status;

a second acquiring unit configured to acquire information regarding a print job retained by the printing apparatus, by communicating with the printing apparatus, and retains the information as a list of the print job retained by the printing apparatus and the information; and a stopping unit configured to refer to the lists retained by the first acquiring unit and the second acquiring unit and stops the transmission of a print job if a number of jobs that have already been transmitted to the printing apparatus by the information processing apparatus is equal to or exceeds a predetermined threshold value or if a number of print jobs retained by the printing apparatus is equal to or exceeds a predetermined threshold value.

The present invention in its second aspect provides an information processing system comprising an information processing apparatus and a printing apparatus that is connected to the information processing apparatus via a network, the information processing apparatus comprising: a first acquiring unit configured to acquire a status of a print job transmitted to the printing apparatus by the information processing apparatus, by communicating with the printing apparatus, and retains the status as a list of the print job and the status;

a second acquiring unit configured to acquire information regarding a print job retained by the printing apparatus, by communicating with the printing apparatus, and retains the information as a list of the print job retained by the printing apparatus and the information; and a stopping unit configured to refer to the lists retained by the first acquiring unit and the second acquiring unit and stops the transmission of a print job if a number of jobs that have already been transmitted to the printing apparatus by the information processing apparatus is equal to or exceeds a predetermined threshold value or if a number of print jobs retained by the printing apparatus is equal to or exceeds a predetermined threshold value.

The present invention in its third aspect provides an information processing method executed in an information processing apparatus that generates a print job and transmits the print job to a printing apparatus, the information processing method comprising the steps of:

acquiring a status of a print job transmitted to the printing apparatus by the information processing apparatus, by communicating with the printing apparatus, and retaining the status as a list of the print job and the status;

acquiring information regarding a print job retained by the printing apparatus, by communicating with the printing apparatus, and retaining the information as a list of the print job retained by the printing apparatus and the information; and referring to the lists retained in the step of acquiring the status and the step of acquiring the information, and stopping the transmission of a print job if a number of jobs that have already been transmitted to the printing apparatus by the information processing apparatus is equal to or exceeds a predetermined threshold value or if a number of print jobs retained by the printing apparatus is equal to or exceeds a predetermined threshold value.

The present invention in its fourth aspect provide a computer-readable medium storing an information processing program for generating a print job and transmitting the print job to a printing apparatus, wherein the information processing program causes a computer to function so as to:

acquire a status of a print job transmitted to the printing apparatus by the information processing apparatus, by communicating with the printing apparatus, and retain the status as a list of the print job and the status;

acquire information regarding a print job retained by the printing apparatus, by communicating with the printing apparatus, and retain the information as a list of the print job retained by the printing apparatus and the information; and refer to the list of the print job and the status and the list of the print job and the information and stop the transmission of a print job if a number of jobs that have already been transmitted to the printing apparatus is equal to or exceeds a predetermined threshold value or if a number of print jobs retained by the printing apparatus is equal to or exceeds a predetermined threshold value.

According to the present invention, the transfer of print data to a printing apparatus is controlled in accordance with the total amount of print data in the printing apparatus and the total amount of print data that has already been transferred from an information processing apparatus. Thus, even in the case where a large amount of print data is transferred to a single printing apparatus by a plurality of information processing apparatuses, print processing of high performance and high reliability can be realized.

Further features of the present invention will become apparent from the following description of exemplary embodiments with reference to the attached drawings.

BRIEF DESCRIPTION OF THE DRAWINGS

FIG. 9 is a diagram showing the format of a printer job information list managed by the information processing system according to the present invention.

DESCRIPTION OF THE EMBODIMENTS

Figure 1:
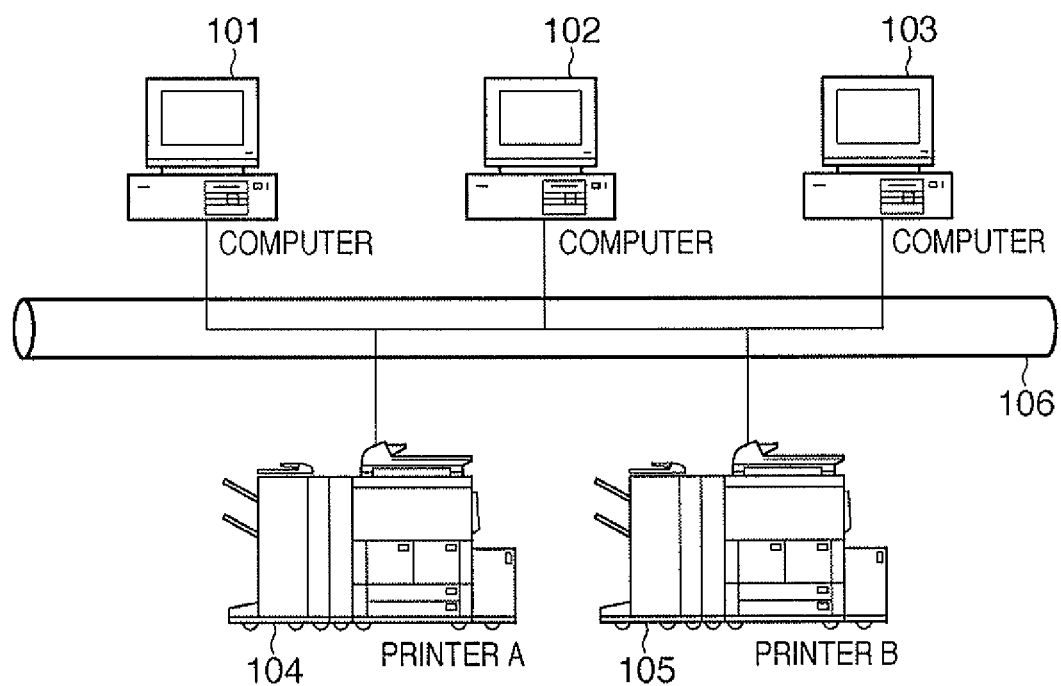
FIG. 1 is a diagram showing the system configuration of an information processing system according to the present invention.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. It should be noted that the same components will be given the same reference numerals, and a description thereof will be omitted.

First Embodiment

Exemplary Configuration of Information Processing System

FIG. 1 is a diagram showing the overall configuration of an information processing system according to the present invention. It should be noted that environments of the entire information processing system described hereinafter are for the purpose of facilitating understanding of the description of the present invention, and the present invention is not limited to these environments.

In FIG. 1, computers 101, 102, and 103 are network computers (hereinafter simply abbreviated to "computers") that are connected to a network 106 and can communicate with one another. The computers, which typically are personal computers (PCs, information processing apparatuses), are each connected to the network 106 via a network cable such as an Ethernet (registered trademark) cable and can execute various programs such as an application program.

The computers 101, 102, and 103 have a function of transferring print job data (hereinafter simply referred to as "job data") generated in the computers 101, 102, and 103 to printers 104 and 105. Also, the computers 101, 102, and 103 can acquire information about job data that has been received by the printers 104 and 105 and processed or stored therein via the network 106, and can display and edit the acquired information.

The printers 104 and 105 are network printers (hereinafter simply abbreviated to "printers") serving as printing apparatuses. The printers 104 and 105 are connected to the network 106 via a network interface that is not shown, analyze job data containing print data transmitted from the computers 101 to 103, convert the data into dot images on a page-by-page basis, and print the images.

Moreover, the printers 104 and 105 display job data received from the computers 101 to 103 on a user interface of the printers 104 and 105, transmit the job data to the computer 101, 102, or 103 by e-mail or the like, and transmit the job data by facsimile to, for example, a facsimile apparatus that is not shown. Hereinafter, the printers 104 and 105 will be referred to as the printer A and the printer B, respectively, when it is necessary to distinguish one from the other. It should be noted that the printers may have different functions.

The network 106 is connected to the computers 101, 102, and 103, the printers 104 and 105, and the like.

Exemplary Hardware Configuration of Network Computers

Figure 2:
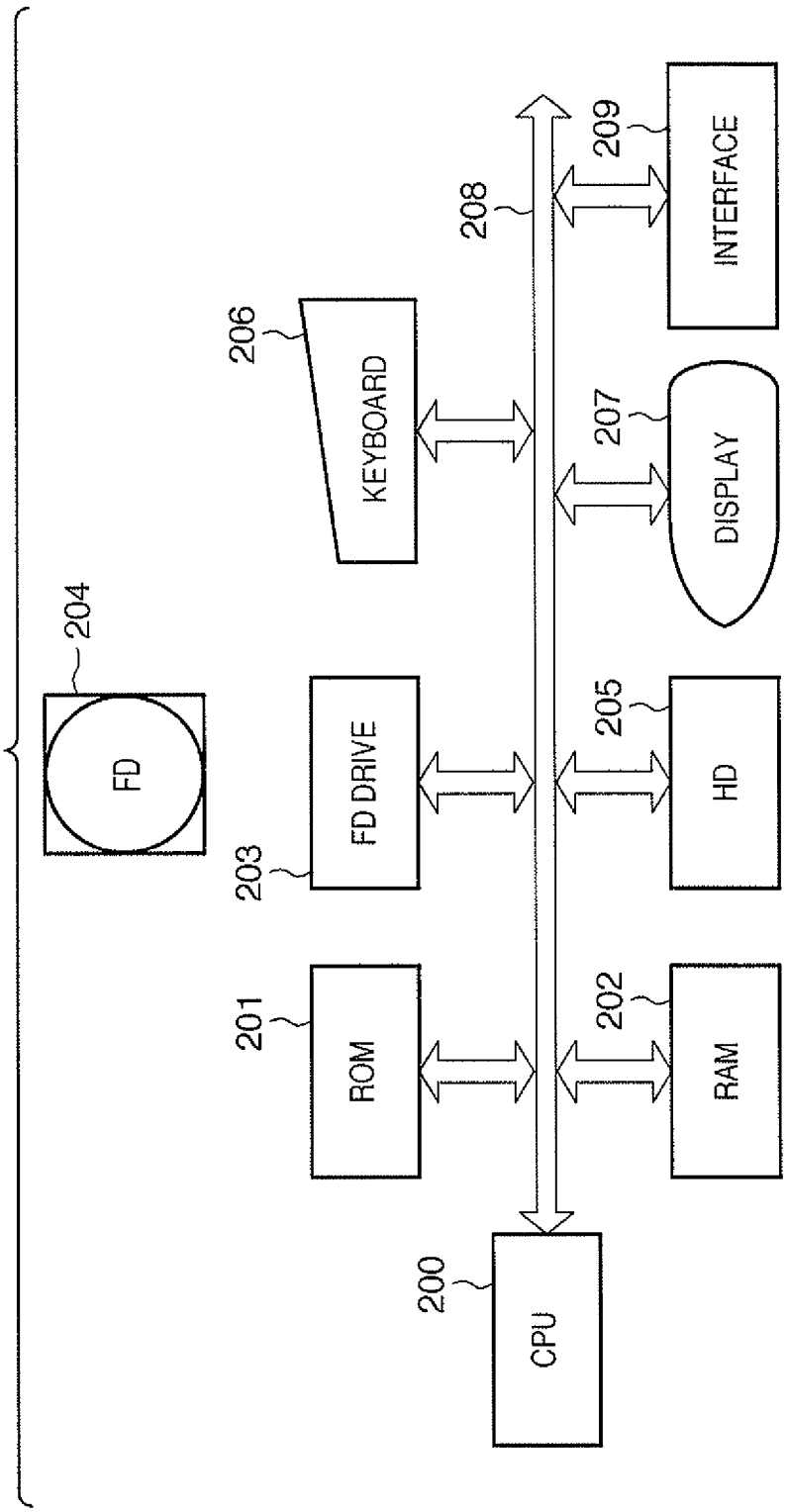
FIG. 2 is a block diagram schematically showing the configuration of a computer in FIG. 1.

FIG. 2 is a block diagram for explaining the configuration of the computers 101, 102, and 103. In FIG. 2, a CPU 200 controls the entire apparatus. The CPU 200 executes an application program, a printer driver program, an OS, an information processing program of first Embodiment, and the like that are stored in a hard disk (HD) 205. Moreover, the CPU 200 also controls the temporary storage of information, a file, and the like that are necessary for the execution of the programs, in a RAM 202.

A ROM 201 is a ROM serving as a storage unit, and programs such as a basic I/O program and various data such as font data and template data to be used in document processing are stored therein. The RAM 202 is a RAM serving as a temporary storage unit and functions as a main memory, a work area, and the like of the CPU 200.

Figure 5:
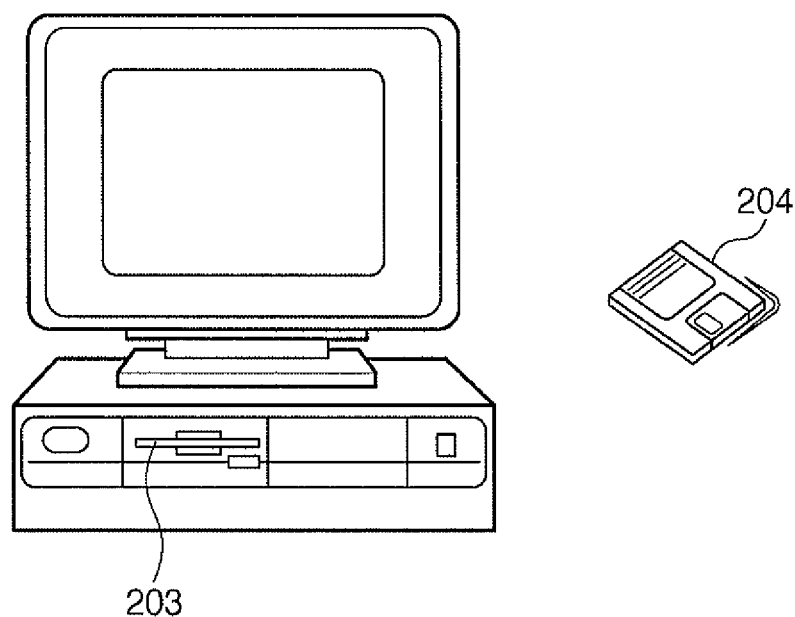
FIG. 5 is a diagram showing the relationship between an FD drive and an FD to be inserted into the FD drive according to the present invention.

An FD drive 203 is a floppy disk drive serving as a storage medium reading unit, and as shown in FIG. 5 described later, a program and the like stored on an FD 204 serving as a storage medium can be loaded into the computer through the FD drive 203. The FD 204 is a floppy disk (FD) as a storage medium on which a program is stored in a computer-readable manner. It should be noted that the storage medium is not limited to the FD and may be any of various types of storage media, such as a CD-ROM, a CDR, a CDRW, a PC card, a DVD, an IC memory card, an MO, and a memory stick.

The HD 205, which is one example of an external storage unit, is a hard disk (HD) that functions as a large-capacity memory and stores the application program, the printer driver program, the OS, the information processing program, a related program, and the like.

A keyboard 206 is a keyboard serving as an instruction input unit, through which a user inputs and gives, for example, instructions of a control command of a device to the computer. A display 207 is a display serving as a display unit and displays a command inputted through the keyboard 206, the status of a printer, and the like.

A bus 208 is a system bus and controls the flow of data in the computer. An interface 209 is an input/output unit for inputting and outputting from and to the outside, and the information processing apparatus exchanges data with an external apparatus via the interface 209.

It should be noted that the configuration of the computers described above is merely an example, and the present invention is not limited to the exemplary configuration in FIG. 2. For example, the storage destination of data or a program can be changed to the ROM, the RAM, the HD, or the like in accordance with the characteristics of the data or the program.

Figure 3:
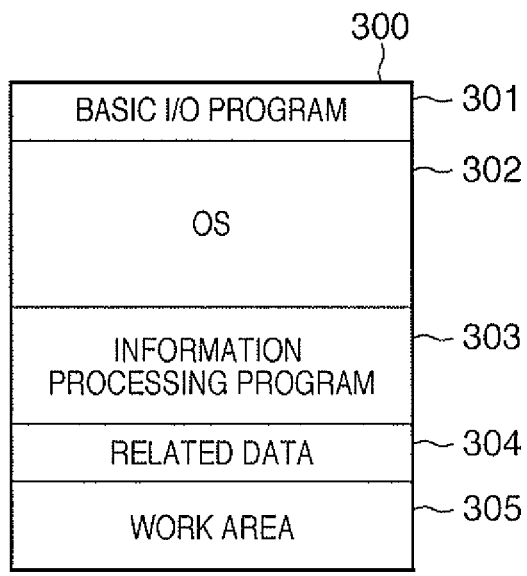
FIG. 3 is a diagram showing a memory map when a program is expanded in a RAM in FIG. 2 from an FD shown in FIG. 4.

FIG. 3 is a diagram showing an example of a memory map 300 of the RAM 202 shown in FIG. 2 and shows a memory map in a state where the information processing program that is loaded from the FD 204 and that controls the information processing system of the present invention has been loaded into the RAM 202 and is ready to run.

It should be noted that in first Embodiment, an example in which the information processing program and related data are directly loaded from the FD 204 into the RAM 202 and executed is described. However, in addition to this, the information processing program may be installed in the HD 205 from the FD 204 beforehand, and each time the information processing program is operated, the information processing program may be loaded into the RAM 202 from the HD 205.

The medium on which the present information processing program is stored may be a CD-ROM, a CDR, a PC card, a DVD, and an IC memory card other than the FD. Furthermore, the present information processing program can also be stored in the ROM 201 in advance so as to form a part of the memory map, and thus can be directly executed by the CPU 200. Moreover, software that realizes functions equal to those of the above-described apparatuses can be substituted for such hardware apparatuses.

An area 301 is for a basic I/O program, which has, for example, an IPL (initial program loading) function by which, when the power supply to the computer is turned on, the OS is read from the HD 205 into the RAM 202 and the operation of the OS is started. An area 302 is for the operating system (OS), and an area 303 is for the information processing program, which is stored in an area reserved on the RAM 202. An area 304 is for the related data, which is stored in an area reserved on the RAM 202. An area 305 is a work area in which an area used by the CPU 200 to execute the present information processing program is reserved.

Figure 4:
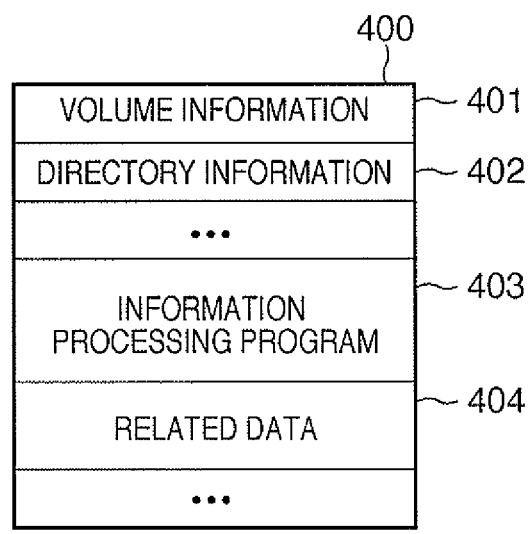
FIG. 4 is a diagram showing a memory map representing data in the FD in FIG. 2.

FIG. 4 is a diagram showing an example of a memory map 400 of the FD 204 shown in FIG. 2. In FIG. 4, an area 401 is for volume information indicating information about data, an area 402 is for directory information, an area 403 is for the information processing program described in first Embodiment, and an area 404 is for the related data of the information processing program. The information processing program is programmed based on a flowchart described in first Embodiment.

FIG. 5 is a diagram showing the relationship between the FD drive 203 shown in FIG. 2 and the FD 204 to be inserted into the FD drive 203, and the same components as those in FIG. 2 are given the same reference numerals. In FIG. 5, the information processing program described in first Embodiment and the related data thereof are stored on the FD 204.

Exemplary Software Configuration of First Embodiment

Figure 6:
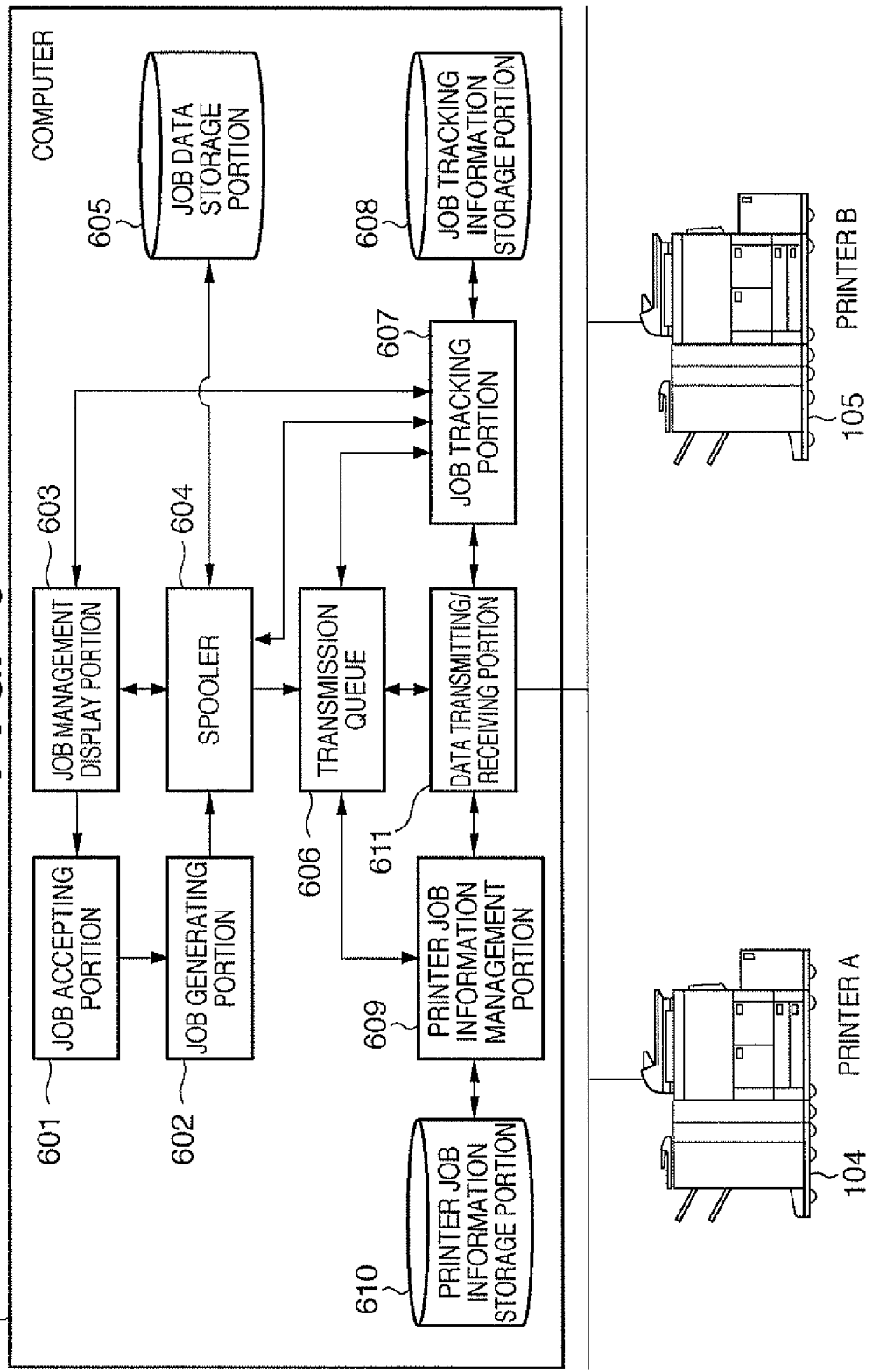
FIG. 6 is a diagram showing an exemplary software configuration of the information processing system according to the present invention.

FIG. 6 is a configuration diagram showing individual function modules of the configuration of the information processing system in the information processing apparatus of first Embodiment. The modules have functions for realizing respective unit as set forth in the claims of the present invention and execute the processing shown in FIGS. 10 and 11.

A job accepting portion 601 accepts print data and output setting information (e.g., the number of copies and the number of pages to be printed, the output paper size, the paper discharge destination tray, and the priority) given as instructions by the user through a user interface (not shown) displayed by a job management display portion 603 that will be described later. It should be noted that the job accepting portion 601 may also accept print data and output setting information from an external application that is not shown in addition to accepting a job from the job management display portion 603.

A job generating portion 602 generates job data (FIG. 7) that can be processed by an output destination printer from the print data and the output setting information accepted by the job accepting portion 601.

Figure 12:
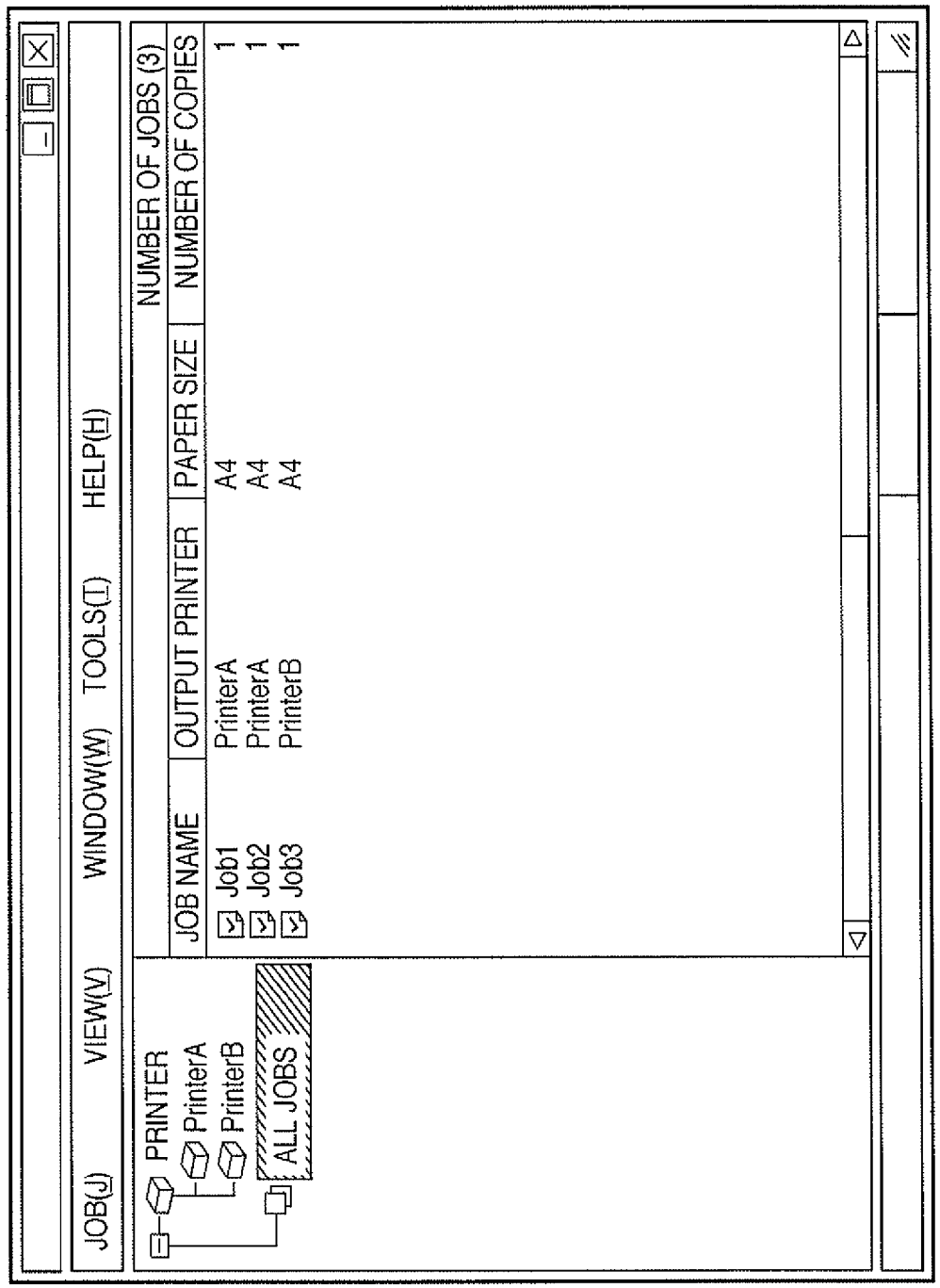
FIG. 12 is a diagram showing a user interface through which a printer is managed in the information processing system according to the present invention.

The job management display portion 603 displays the user interface as shown in FIG. 12 described later. In the job management display portion 603, the processing status in the printer of job data that can be managed by the information processing system of first Embodiment is displayed. Moreover, the user can specify print data and output setting information and give instructions for the execution of printing through a user interface that is not shown.

A spooler 604 schedules job data received from the job generating portion 602 and sequentially outputs the job data to a transmission queue 606. When transmitting jobs to the output destination printer, the spooler 604 gives the output setting information a job tracking ID issued by a job tracking portion 607. Also, the spooler 604 stores the job data in a job data storage portion 605 and manages the stored job data.

The job data storage portion 605 stores job data accepted by the spooler 604 and job data that has been transmitted to the printer via the spooler 604 before. The stored job data is used for reprinting or the like.

Figure 10:
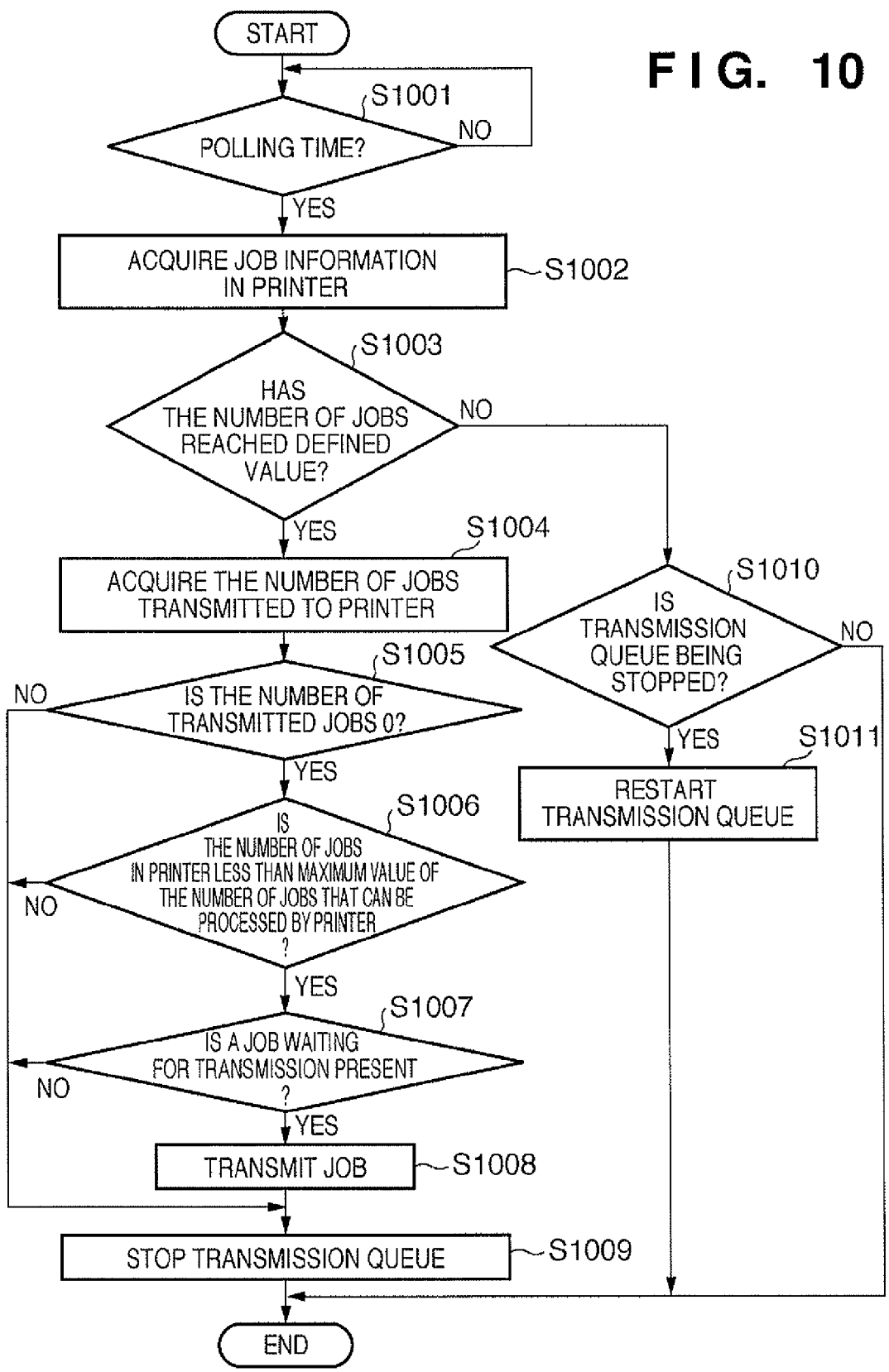
FIG. 10 is a flowchart showing job transmission control processing performed by the information processing system of the present invention.

The transmission queue 606 queues job data accepted from the spooler 604 and transmits the job data to the output destination printer via a data transmitting/receiving portion 611. The transmission queue 606 controls the stopping and restarting of the queue (the stopping and restarting of job transmission) as shown in FIG. 10 based on information received from the job tracking portion 607 or a printer job information management portion 609.

It should be noted that information about a preset value (limit value) that is used to stop and restart the queue is predefined (e.g., in a file that is not shown) in the information processing system and read by the transmission queue 606.

Figures 7, 8:
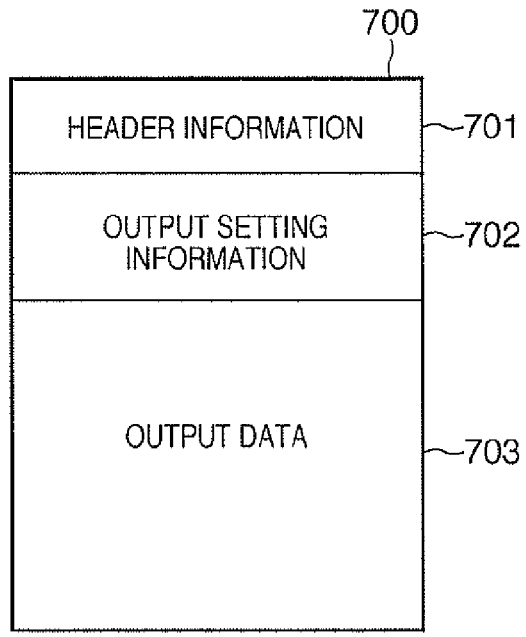
FIG. 7 is a diagram showing the format of job data according to the present invention.
FIG. 8 is a diagram showing the format of a job tracking information list managed by the information processing system according to the present invention.

The job tracking portion 607 issues a unique job tracking ID under instructions from the spooler 604. Moreover, the job tracking portion 607 generates a job tracking information list 800 as shown in FIG. 8 and tracks the processing status of job data sent out from the spooler 604 to the output destination printer. The tracking information is provided to the job management display portion 603 and displayed on the user interface by the job management display portion 603.

The job tracking information storage portion 608 stores the job tracking information list 800 as shown in FIG. 8. The job tracking portion 607 uses the job tracking information list 800 to track the processing status of job data.

Figure 11:
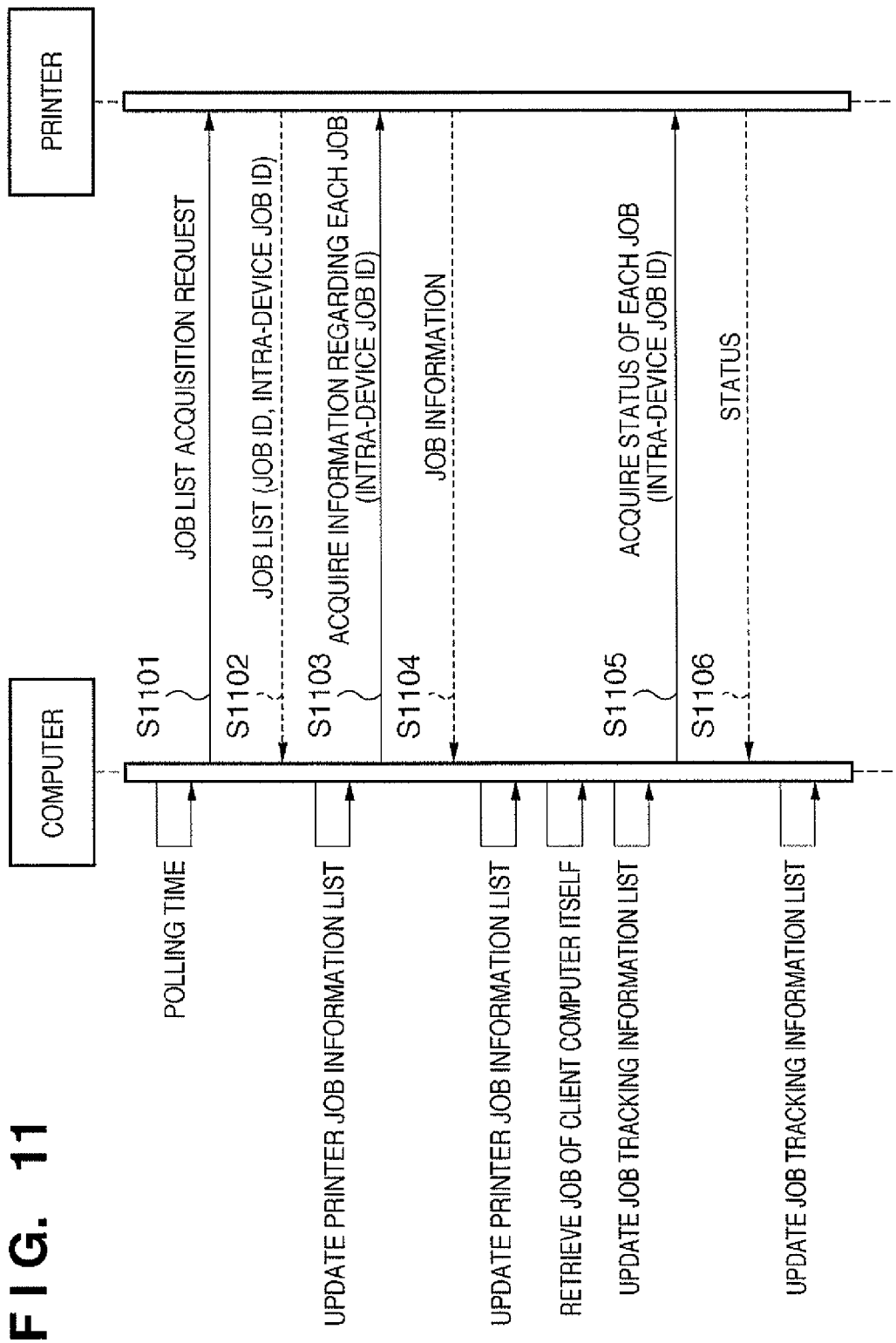
FIG. 11 is a sequence showing processing up to the time when the job tracking information list and the printer job information list are created by the information processing system of the present invention.

The printer job information management portion 609 is a printer job information management portion that acquires, from the printer 104 or 105 via the data transmitting/receiving portion 611, job information that is being processed in the printer and manages the acquired job information. In the printer job information management portion 609, a printer job information list 900 as shown in FIG. 9 in which job information acquired in a sequence shown in FIG. 11 is recorded is generated and stored in the printer job information storage portion 610.

The printer job information storage portion 610 stores the printer job information list 900 as shown in FIG. 9.

The data transmitting/receiving portion 611 transmits job data to the printer 104 or 105 and receives information from the printer 104 or 105, via the network 106.

Example of Job Data of First Embodiment

FIG. 7 is a diagram showing the format of job data 700 that is generated by the job generating portion 602 and transmitted to the printer 104 or 105 in the information processing system of first Embodiment. In the present invention, the job data 700 contains data that is necessary for the execution of printing in the printer 104 or 105 and also contains a job tracking ID that is necessary for the information processing system to track the processing status of the job data.

An area 701 is for header information containing information that is necessary for the transmission of job data to the printer 104 or 105 and information about the job data to be transmitted.

An area 702 is for output setting information containing output settings to be given as instructions to the printer 104 or 105. The output setting information is generated from the output setting information given as instructions by the user in the job management display portion 603. Specifically, the output settings include the number of copies and the number of pages to be printed, the output paper size, the paper discharge destination, and the priority. Moreover, the job tracking ID generated by the job tracking portion 607 is also set in this area.

An area 703 contains drawing information about output data to be drawn by the printer 104 or 105. It should be noted that the job data 700 is not limited to the above-described form and may be in any form as long as the output setting information and the drawing information about output data to be printed can be identified.

Example of Job Tracking Information List of First Embodiment

FIG. 8 is a diagram showing an example of the job tracking information list 800 stored in the job tracking information storage portion 608 of the information processing system of first Embodiment. The job tracking information list 800 retains information for tracking the processing status of job data transmitted to the printer 104 or 105 by the computer itself. This list does not contain information about job data transmitted from other computers.

For example, a job name 801, a job ID 802, an intra-device job ID 803, a printer 804, and a status 805 are registered with the job tracking information list 800.

The job name 801 is information indicating a job data name assigned to job data. The job name 801 may be a name specified by, for example, the user or may be the name of print data. This information is mainly used in order for the user to identify job data in a job list displayed by the job management display portion 603.

The job ID 802 is identification information (a job tracking ID) uniquely assigned to job data by the job tracking portion 607 in order to track the job data in the information processing system. The intra-device job ID 803 is identification information assigned to job data in the printer 104 or 105.

When an inquiry about information regarding job data or a job data operation is made to the printer 104 or 105, the intra-device job ID 803 is used to specify the job data. The printer 804 is information indicating the name of an output destination printer (the name of a printer object) in which output processing or the like is to be performed on job data.

The status 805 is information indicating the processing status of job data. For example, in first Embodiment, "job-processing waiting state", "mid-job-processing state", "print waiting state", and "mid-print state" statuses indicate that a job is present in the printer and is waiting to be processed or is being processed in the printer. Moreover, "job-transfer waiting state" and "mid-job-transfer state" indicate that job data has not yet been transferred from the computers 101 to 103 to the printer 104 or 105. These statuses are acquired by, for example, the job tracking portion 607 communicating with the printer 104 or 105 in the sequence as shown in FIG. 11 (such processing is an example of a first acquiring unit of first Embodiment).

Example of Printer Job Information List of First Embodiment

FIG. 9 is a diagram showing an example of the printer job information list 900 stored in the printer job information storage portion 610 of the information processing system of first Embodiment. The printer job information management portion 609 acquires information in the printer job information list 900 from the printer 104 or 105 in the sequence as shown in FIG. 11. It should be noted that information regarding all the jobs that are present in the printer 104 or 105 is registered with the printer job information list 900. In other words, this list also contains information about job data transmitted from other computers.

For example, a printer 901, an intra-device job ID 902, a job ID 903, a job name 904, a user name 905, a page number 906, a size 907, a paper discharge destination 908, an estimated print end time 909, and a priority 910 are registered with the printer job information list 900.

The printer 901, the intra-device job ID 902, the job ID 903, and the job name 904 are the same information as the printer 804, the intra-device job ID 803, the job ID 802, and the job name 801, respectively.

The user name 905 is the name of an owner (the transmitter) of job data transmitted to the printer 104 or 105. This information is information described in the output setting information (area 702) of the job data 700 transmitted to the printer 104 or 105.

The page number 906 is information indicating the total number of pages of the output data (area 703) of the job data 700. This information may be information described in the output setting information (area 702) of the job data 700 transmitted to the printer 104 or 105 or may be determined by the printer 104 or 105 from the output data (area 703).

The size 907 is information indicating the total data size of the output data (area 703) of the job data 700. This information may be information described in the output setting information (area 702) of the job data 700 transmitted to the printer 104 or 105 or may be determined by the printer 104 or 105 from the output data (area 703).

The paper discharge destination 908 is information indicating a destination to which output that is generated as a result of executing print processing in the printer 104 or 105 is to be discharged. This information is information described in the output setting information (area 702) of the job data 700 transmitted to the printer 104 or 105.

The estimated print end time 909 is information indicating the time when print processing of job data will be completed. This information is a value calculated by the printer 104 or 105 from the number of pages of the job data and other information.

The priority 910 is information indicating the printing priority of job data. The printer 104 or 105 determines the order in which the job data is processed based on this information. This information is information described in the output setting information (area 702) of the job data 700 transmitted to the printer 104 or 105.

For example, the printer job information management portion 609 acquires these pieces of information by communicating with the printer 104 or 105 in the sequence as shown in FIG. 11 (such processing is an example of a second acquiring unit of first Embodiment).

Process Sequence of Information Processing System of First Embodiment

FIG. 10 is a diagram showing the procedure of a process in which job data transmission is controlled in the transmission queue 606 in accordance with the number of job data items in the printer 104 or 105 and the number of job data items transmitted by the computer 101, 102, or 103 itself.

Programs related to respective flows are stored in the hard disk (HD) 205 of the computer 101, 102, or 103, and read into the RAM 202 and executed by the CPU 200. It should be noted that in the present sequence, control of job transmission from the computer 101 shown in FIG. 1 to the printer A will be described as an example.

In step S1001, the printer job information management portion 609 determines whether it is time (polling time) to acquire job data information from the printer A. It should be noted that although polling by which information is acquired at certain time intervals is used in first Embodiment, the acquisition of job data information may be performed in response to a notification of an event from the printer A.

In step S1002, the printer job information management portion 609 and the job tracking portion 607 acquire job data information from the printer A in the sequence shown in FIG. 11. Then, the printer job information list 900 and the job tracking information list 800 stored in the printer job information storage portion 610 and the job tracking information storage portion 608 are updated with the acquired job data information. Here, a new list may be generated using the job data information. When the content of the printer job information list 900 is updated or generated, the transmission queue 606 is notified of the content of the printer job information list 900.

In step S1003, the transmission queue 606 counts the number of jobs retained in a queue in the printer A from the information received from the printer job information management portion 609 and determines whether or not the number of jobs has reached a number predetermined by the information processing system. Here, if the counted number of jobs is equal to or exceeds the predetermined number of jobs, the process is advanced to step S1004. On the other hand, if the counted number of jobs is less than the predetermined number of jobs, the process is advanced to step S1010.

In step S1004, the transmission queue 606 acquires information in the job tracking information list 800 stored in the job tracking information storage portion 608 by the job tracking portion 607. Then, the transmission queue 606 counts the number of jobs that have already been transmitted from the computer 101 to the printer A (jobs whose status 805 is that of a "job-processing waiting state", "mid-job-processing state", "print waiting state", or "mid-print state").

In step S1005, the transmission queue 606 determines whether or not the number of transmitted jobs that was counted in step S1004 is 0. Here, if the number of transmitted jobs is 0, the process is advanced to step S1006. On the other hand, if the number of transmitted jobs is not 0, the process is advanced to step S1009. It should be noted that although the threshold value used in determining the number of jobs is 0 in first Embodiment, a threshold value of 1 or more is also applicable. Moreover, the threshold value may be a value predetermined by the information processing system, and the determination may be made depending on whether the number of jobs is equal to or exceeds that threshold value or is less than that threshold value. In this case, if the number of transmitted jobs is equal to or exceeds the threshold value, the process proceeds to step S1009, and if the number of transmitted jobs is less than the threshold value, the process proceeds to step S1006.

In step S1006, the transmission queue 606 determines whether or not the number of jobs in the printer A that was counted in step S1003 is less than a maximum value of the number of jobs that can be processed by the printer A. Here, if the counted number of jobs is less than the maximum value, the process is advanced to step S1007. On the other hand, if the counted number of jobs is equal to or exceeds the maximum value, the process is advanced to step S1009. It should be noted that the number of jobs that can be processed by the printer A may be predetermined by the information processing system. Alternatively, the computer 101 may acquire the number of jobs that can be processed by the printer A from the printer A.

In step S1007, the transmission queue 606 determines whether or not a job that has been received from the spooler 604 and queued is present. Here, if such a job is present, the process is advanced to step S1008. On the other hand, if such a job is absent, the process is advanced to step S1009.

In step S1008, the transmission queue 606 transmits one job data item to the printer A via the data transmitting/receiving portion 611. Here, the number of jobs to be transmitted may be, for example, a number predetermined by the information processing system. Alternatively, two or more jobs may be transmitted if the maximum number of jobs that can be processed by the printer A is not reached.

In step S1009, the transmission queue 606 stops job data transmission processing for job data items after the currently-transmitted job data item.

In step S1010, the transmission queue 606 determines whether or not job data transmission processing in the transmission queue 606 is stopped. Here, if the processing is stopped, the process is advanced to step S1011. On the other hand, if the processing is not stopped, the transmission queue 606 finishes the present process and waits until the next polling time.

In step S1011, the transmission queue 606 restarts job data transmission processing in the transmission queue 606 to finish the present process and waits until the next polling time.

As described above, in first Embodiment, it is confirmed that the number of jobs that have already been transmitted from the computer to the printer is 0 (i.e., the jobs have already been processed in the printer) and that the number of jobs in the printer has not reached the maximum number of jobs that can be processed by the printer. Job data retained in the transmission queue is transmitted to the printer after this confirmation, and the risk that, when job data is transmitted, a transmission failure may occur because the queue of the printer is full at the time of the transmission can thus be reduced.

Job Data Information Acquiring Sequence of Information Processing System of First Embodiment FIG. 11 is a diagram showing the procedure of a process, of first Embodiment, in which the printer job information management portion 609 acquires information about job data from the printer 104 or 105 and creates the job tracking information list 800 and the printer job information list 900. FIG. 11 illustrates exchanges of information between the computer 101, 102, or 103 and the printer 104 or 105. It should be noted that in the present sequence, exchanges of information between the computer 101 and the printer A will be described as an example.

In step S1101, the printer job information management portion 609 of the computer 101 transmits, to the printer A, a request to acquire a job data list that is present in the printer A.

In step S1102, in response to the above-described acquisition request, the printer A transmits a list of job data items including job IDs and intra-device job IDs to the computer 101.

The printer job information management portion 609 of the computer 101 registers information in the received job data list with the printer job information list 900. Furthermore, in step S1103, the printer job information management portion 609 transmits a request to acquire other information (e.g., the job name and the user name, the page number, the size, the paper discharge destination, and the estimated print end time) about each job data item using the intra-device job IDs.

In step S1104, in response to the acquisition request, the printer A transmits information about the job data to the computer 101.

The printer job information management portion 609 of the computer 101 registers the received information about the job data with the printer job information list 900. The job tracking portion 607 of the computer 101 acquires information in the printer job information list 900 from the printer job information management portion 609 and retrieves job data transmitted from the computer 101, using the job ID 802 of the job tracking information list 800. Moreover, the job tracking portion 607 registers the information of the intra-device job ID 902 with the job tracking information list 800.

In step S1105, the job tracking portion 607 of the computer 101 transmits a request to acquire the status of each job data item to the printer A using the intra-device job ID 803.

In step S1106, in response to the acquisition request, the printer A transmits the status of the job data to the computer 101. The job tracking portion 607 of the computer 101 registers the received status with the job tracking information list 800.

User Interface for Job Management of First Embodiment

FIG. 12 is a diagram showing an example of the user interface displayed by the job management display portion 603 in the information processing system of first Embodiment. The job management display portion 603 displays information in the job tracking information list 800 as the processing status of job data. The user can thus confirm the processing status of job data transmitted from the computer to the printer 104 or 105 and can operate the job data as necessary. Moreover, by selecting a node of a printer object from a tree shown in the left of FIG. 12, the job processing status of each printer object can be displayed (not shown).

Furthermore, by selecting a specific menu, the user can specify print data and output setting information and give instructions for the execution of printing.

As described above, in first Embodiment, transmission in the transmission queue of the computer is controlled in accordance with the number of job data items in the printer 104 or 105 and the number of job data items transmitted by the computer itself. As a result, any job submitted by the user is no longer canceled due to an increase in the load on the printer, and efficient and highly reliable print processing can thus be realized.

In first Embodiment, the method of controlling transmission in accordance with the number of job data items in the printer and in the computer is described. However, the present invention is not limited to such a method using the number of job data items and can also be applied to a method of controlling transmission using the number of pages or the size of the job data. That is to say, the transmission queue is stopped if the number of pages or the size is equal to or exceeds a preset number of pages or size and transmission processing of the transmission queue is restarted if the preset value is not exceeded, whereby transmission is controlled.

Moreover, the present invention can also be applied to a method of controlling transmission using the estimated time of the end of print processing. In other words, even when the number of job data items in the printer is equal to or exceeds a preset value, the transmission queue is not stopped if the time until the end of print processing in the printer does not exceed a preset value. Thus, the transmission queue keeps transmitting job data as long as smooth job data processing is continued, and print processing can therefore be performed more efficiently.

Furthermore, the present invention can also be applied to a method of controlling transmission using the priority of job data. In other words, when the priority associated with job data is equal to or exceeds a preset value, the job data is transmitted if the maximum value of the number of jobs that can be processed by the printer is not reached. Thus, a job of high priority can be preferentially printed without the transmission of the job being stopped.

Second Embodiment

In first Embodiment, the method of controlling transmission in accordance with the number of job data items in the printer and the number of job data items transmitted from the computer is described. However, the present invention can also be applied to the case where transmission is controlled in accordance with the number of transmitting users and the number of paper discharge destinations (paper discharge trays) of the printer.

In second Embodiment, the case where transmission is controlled in accordance with the number of transmitting users and the number of paper discharge destinations of the printer will be described in detail below while referring to the drawings when differences from first Embodiment are concerned.

Process Sequence of Information Processing System of Second Embodiment

Figure 13:
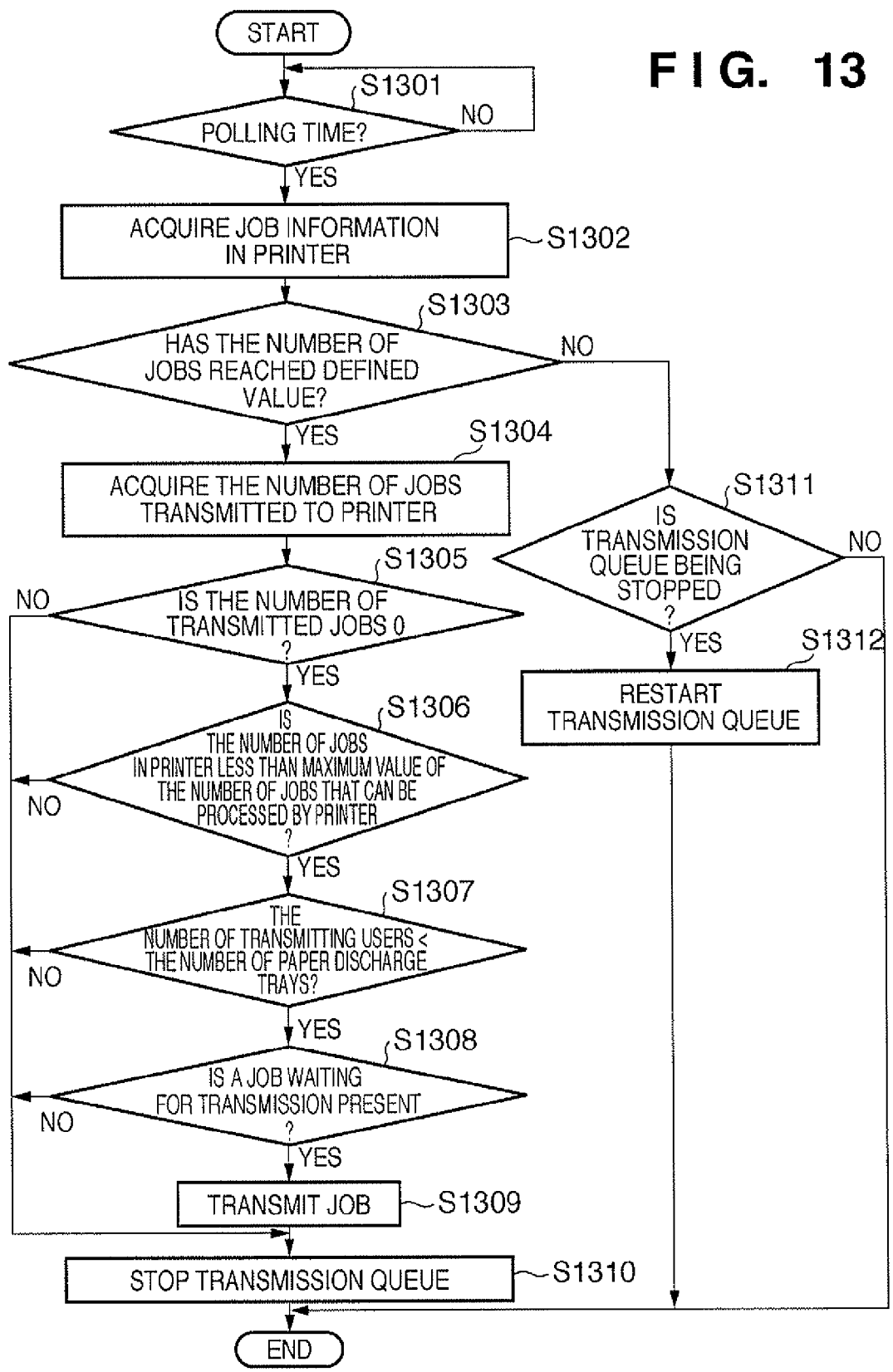
FIG. 13 is a flowchart showing job transmission control processing performed by an information processing system in second Embodiment of the present invention.

FIG. 13 is a flowchart showing the procedure of a process, of second Embodiment, in which job data transmission is controlled in the transmission queue 606 in accordance with the number of jobs in the printer 104 or 105 and the status of job data transmitted by the computer 101, 102, or 103 itself.

Programs related to respective flows are stored in the hard disk 205 of the computer 101, 102, or 103, and are read into the RAM 202 and executed by the CPU 200. In this sequence example, control of the transmission from the computer 101 to the printer A will be described as an example.

In step S1301, the printer job information management portion 609 determines whether it is time (polling time) to acquire job data information from the printer A. It should be noted that although polling by which information is acquired at certain time intervals is used in second Embodiment, the acquisition of job data information may be performed in response to an event from the printer A.

In step S1302, the printer job information management portion 609 and the job tracking portion 607 acquire job data information from the printer A in the sequence shown in FIG. 11. Then, the printer job information list 900 and the job tracking information list 800 stored in the printer job information storage portion 610 and the job tracking information storage portion 608 are updated with the acquired job data information. Here, a new list may be generated using the job data information. When the content of the printer job information list 900 is updated or generated, the transmission queue 606 is notified of the content of the printer job information list 900.

In step S1303, the transmission queue 606 counts the number of jobs from the information received from the printer job information management portion 609 and determines whether or not the number of jobs has reached a number predetermined by the information processing system. Here, if the counted number of jobs is equal to or exceeds the predetermined number of jobs, the process is advanced to step S1304. On the other hand, if the counted number of jobs is less than the predetermined number of jobs, the process is advanced to step S1311.

In step S1304, the transmission queue 606 acquires information in the job tracking information list 800 stored in the job tracking information storage portion 608 by the job tracking portion 607. Furthermore, the transmission queue 606 counts the number of jobs that have already been transmitted to the printer A from the computer 101 (jobs whose status 805 is that of a "job-processing waiting state", "mid-job-processing state", "print waiting state", or "mid-print state").

In step S1305, the transmission queue 606 determines whether or not the number of transmitted jobs that was counted in step S1304 is 0. Here, if the number of transmitted jobs is 0, the process is advanced to step S1306. On the other hand, if the number of transmitted jobs is not 0, the process is advanced to step S1310. It should be noted that although the threshold value used for determining the number of jobs is 0 in second Embodiment, a threshold value of 1 or more is also applicable. Moreover, the threshold value may be a value predetermined by the information processing system and the determination may be made depending on whether the number of transmitted jobs is equal to or exceeds that threshold value or is less than that threshold value. In this case, if the number of transmitted jobs is equal to or exceeds the threshold value, the process proceeds to step S1310, and if the number of transmitted jobs is less than the threshold value, the process proceeds to step S1306.

In step S1306, the transmission queue 606 determines whether or not the number of jobs in the printer A that was counted in step S1303 is less than a maximum value of the number of jobs that can be processed by the printer A. Here, if the counted number of jobs is less than the maximum value, the process is advanced to step S1307. On the other hand, if the counted number of jobs is equal to or exceeds the maximum value, the process is advanced to step S1310. It should be noted that the number of jobs that can be processed by the printer A may be predetermined by the information processing system. Alternatively, the computer 101 may acquire the number of jobs that can be processed by the printer A from the printer A.

In step S1307, the transmission queue 606 counts the number of users transmitting job data to the printer A from a user name 905 of the printer job information list 900 and, furthermore, counts the number of designated paper discharge destinations from a paper discharge destination 908. Here, the number of users transmitting job data to the printer A is the number of users corresponding to respective jobs in the printer job information list 900.

The transmission queue 606 compares the two above-described counted numbers and determines whether or not the counted number of users is less than the counted number of paper discharge destinations. Here, if the number of users is less than the number of paper discharge destinations, the process is advanced to step S1308. On the other hand, if the number of users is equal to or exceeds the number of paper discharge destinations, the process is advanced to step S1310. It should be noted that in second Embodiment, instead of making the determination based on the number of paper discharge destinations 908, a paper discharge destination that is currently not in use may be acquired from the printer A and the determination may be made based on this information.

In step S1308, the transmission queue 606 determines whether or not job data that has been received from the spooler 604 and queued is present. Here, if such job data is present, the process is advanced to step S1309. On the other hand, if such job data is absent, the process is advanced to step S1310.

In step S1309, the transmission queue 606 transmits one job data item to the printer A via the data transmitting/receiving portion 611. Here, the number of jobs to be transmitted may be, for example, a number predetermined by the information processing system. Alternatively, two or more jobs may be transmitted if the maximum number of jobs that can be processed by the printer A is not reached.

In step S1310, the transmission queue 606 stops job data transmission processing for job data after the currently-transmitted job data.

In step S1311, the transmission queue 606 determines whether or not job data transmission processing in the transmission queue 606 is stopped. Here, if the processing is stopped, the process is advanced to step S1312. On the other hand, if the processing is not stopped, the transmission queue 606 finishes the present process and waits until the next polling time.

In step S1312, the transmission queue 606 restarts job data transmission processing in the transmission queue 606 to finish the present process and waits until the next polling time.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-305628 filed Nov. 28, 2008, which is hereby incorporated by reference herein in its entirety.

What is claimed is:

1. An information processing apparatus that transmits a print job to a printing apparatus which is able to receive a plurality of print jobs from a plurality of information processing apparatuses, the information processing apparatus comprising:
    a storing unit configured to store print jobs;
    a transmitting unit configured to transmit a print job stored in the storing unit to the printing apparatus in order;
    an acquiring unit configured to acquire, from the printing apparatus, a first number of print jobs that are queued to be printed by the printing apparatus, wherein the first number of print jobs includes the print job transmitted by the transmitting unit of the information processing apparatus and at least one print job transmitted to the printing apparatus from another information processing apparatus of the plurality of information processing apparatuses;
    a first determination unit configured to determine whether or not the acquired first number of print jobs exceeds a first threshold value;
    a controlling unit configured to control the transmitting unit to stop transmitting the print job in a case where the first determination unit determines that the acquired first number of print jobs is equal to or greater than the first threshold value; and
    a second determination unit configured to, in a case where the first determination unit determines that the acquired first number of print jobs is equal to or greater than the first threshold value, determine whether or not a second number of print jobs among the acquired first number of print jobs is less than a second threshold value, wherein the second number of print jobs is a number of print jobs that have been transmitted from the transmitting unit of the information processing apparatus and are queued to be printed by the printing apparatus,
    wherein, even if the first number of print jobs is equal to or greater than the first threshold value, in a case where the second determination unit determines that the second number of print jobs is less than the second threshold value, the controlling unit controls the transmitting unit to continue the transmission of the print job such that the transmission is not stopped.

2. The apparatus according to claim 1, wherein the first number of print jobs and the second number of print jobs comprises one of a number of pages based on a print job, and a file size based on a print job.

3. The apparatus according to claim 2, wherein, even if the first number of print jobs is equal to or greater than the first threshold, in a case where a time period which is required for finishing printing based on print jobs that have been transmitted from the transmitting unit is shorter than a predetermined time period, the controlling unit controls the transmitting unit to continue the transmission.

4. The apparatus according to claim 3, wherein, even if the first number of print jobs is equal to or greater than the first threshold, in a case where the print jobs have higher priorities than a predetermined priority, the controlling unit controls the transmitting unit to continue the transmission.

5. The apparatus according to claim 4, wherein, in a case where a number of users who instruct to print in the printing apparatus is equal to or greater than a predetermined number, the controlling unit controls the transmitting unit to stop transmitting.

6. The apparatus according to claim 5, wherein the number of users corresponds to either a number of discharge trays of the printing apparatus or a number of unused discharge trays of the printing apparatus.

7. An information processing system comprising:
    a printing apparatus which is able to receive a plurality of print jobs from a plurality of information processing apparatuses; and
    an information processing apparatus that transmits a print job to the printing apparatus, wherein the information processing apparatus comprises:
    a storing unit configured to store print jobs,
    a transmitting unit configured to transmit a print job stored in the storing unit to the printing apparatus in order,
    an acquiring unit configured to acquire, from the printing apparatus, a first number of print jobs that are queued to be printed by the printing apparatus, wherein the first number of print jobs includes the print job transmitted by the transmitting unit of the information processing apparatus and at least one print job transmitted to the printing apparatus from another information processing apparatus of the plurality of information processing apparatuses;
    a first determination unit configured to determine whether or not the acquired first number of print jobs exceeds a first threshold value;
    a controlling unit configured to control the transmitting unit to stop transmitting the print job in a case where the first determination unit determines that the acquired first number of print jobs is equal to or greater than the first threshold value; and
    a second determination unit configured to, in a case where the first determination unit determines that the acquired first number of print jobs is equal to or greater than the first threshold value, determine whether or not a second number of print jobs among the acquired first number of print jobs is less than a second threshold value, wherein the second number of print jobs is a number of print jobs that have been transmitted from the transmitting unit of the information processing apparatus and are queued to be printed by the printing apparatus,
    wherein, even if the first number of print jobs is equal to or greater than the first threshold value, in a case where the second determination unit determines that the second number of print jobs is less than the second threshold value, the controlling unit controls the transmitting unit to continue the transmission of the print job such that the transmission is not stopped.

8. An information processing method executed in an information processing apparatus that transmits a print job to a printing apparatus which is able to receive a plurality of print jobs from a plurality of information processing apparatuses, the information processing method comprising:

storing print jobs in a storing unit;

transmitting a print job stored in the storing unit to the printing apparatus in order;

acquiring, from the printing apparatus, a first number of print jobs that are queued to be printed by the printing apparatus, wherein the first number of print jobs includes the print job transmitted in the transmitting step and a print job transmitted to the printing apparatus from another information processing apparatus of the plurality of information processing apparatuses;

a first determining step of determining whether or not the acquired first number of print jobs exceeds a first threshold value;

controlling the transmitting step to stop transmitting the print job in a case where the first determining step determines that the acquired first number of print jobs is equal to or greater than the first threshold; and a second determining step of, in case where the first determining step determines that the acquired first number of print jobs is equal to or greater than the first threshold value, determining whether or not a second number of print jobs among the acquired first number of print jobs is less than a second threshold value, wherein the second number of print jobs is a number of print jobs that have been transmitted by the transmitting step of the information processing apparatus and are queued to be printed by the printing apparatus, wherein, even if the first number of print jobs is equal to or greater than the first threshold value, in a case where the second determining step determines that the second number of print jobs is less than the second threshold value, the controlling step controls the transmitting step to continue the transmission of the print job such that the transmission is not stopped.

9. A non-transitory computer-readable medium retrievably storing a program which causes a computer to perform an information processing method of an information processing apparatus that transmits a print job to a printing apparatus which is able to receive a plurality of print jobs from a plurality of information processing apparatuses, the information processing method comprising:

storing print jobs in a storing unit;

transmitting a print job stored in the storing unit to the printing apparatus in order;

acquiring, from the printing apparatus, a first number of print jobs that are queued to be printed by the printing apparatus, wherein the first number of print jobs includes the print job transmitted in the transmitting step and a print job transmitted to the printing apparatus from another information processing apparatus of the plurality of information processing apparatuses;

a first determining step of determining whether or not the acquired first number of print jobs exceeds a first threshold;

controlling the transmitting step to stop transmitting the print job in a case where the first number of print jobs is equal to or greater than the first threshold value; and a second determining step of, in case where the first determining step determines that the acquired first number of print jobs is equal to or greater than the first threshold value, determining whether or not a second number of print jobs among the acquired first number of print jobs is less than a second threshold value, wherein the second number of print jobs is a number of print jobs that have been transmitted by the transmitting step of the information processing apparatus and are queued to be printed by the printing apparatus, wherein, even if the first number of print jobs is equal to or greater than the first threshold value, in a case where the second determining step determines that the second number of print jobs is less than the second threshold value, the controlling step controls the transmitting step to continue the transmission of the print job such that the transmission is not stopped.

* * * * *